United States Patent
Yoshikawa et al.

(10) Patent No.: US 6,174,085 B1
(45) Date of Patent: Jan. 16, 2001

(54) LINEAR GUIDE BEARING DEVICE

(75) Inventors: Tomonobu Yoshikawa; Nobuaki Mitamura, both of Fujisawa (JP)

(73) Assignee: NSK Ltd. (JP)

(*) Notice: Under 35 U.S.C. 154(b), the term of this patent shall be extended for 0 days.

(21) Appl. No.: 09/226,032

(22) Filed: Jan. 5, 1999

(30) Foreign Application Priority Data

Jan. 12, 1998 (JP) .................................. 10-003976

(51) Int. Cl.$^7$ ...................................... F16C 29/06
(52) U.S. Cl. ........................... 384/45; 384/625; 384/912
(58) Field of Search ................... 384/43, 49, 50, 384/45, 48, 625, 912

(56) References Cited

U.S. PATENT DOCUMENTS 5,030,017 * 7/1991 Murakami et al. .................. 384/492

* cited by examiner

Primary Examiner—Lenard A. Footland
(74) Attorney, Agent, or Firm—Christensen O'Connor Johnson Kindness PLLC (57) ABSTRACT

A linear guide bearing device includes a rail, a bearing supported by the rail and rectilinearly movable along the axial direction of the rail, and rolling members interposed between the rail and the bearing to roll along with motion of the bearing. At least one of the rail and the bearing is made of induction-hardened steel including 0.6 to 0.9 wt % of carbon, 0.05 to 0.25 wt % of silicon, 0.3 to 0.9 wt % of manganese, 0.1 to 0.5 wt % of chromium, 0.2 to 1.0 wt % of molybdenum, and residual portion as iron and unavoidable impurities, and the induction-hardened steel has a total content of carbon, manganese, and molybdenum, which satisfies predetermined inequalities.

4 Claims, 3 Drawing Sheets

LINEAR GUIDE BEARING DEVICE

BACKGROUND OF THE INVENTION

The present invention relates to a linear guide bearing device and, more particularly, to a linear guide bearing device in which rolling members are disposed between a rail and a bearing.

Linear guide bearing devices have been generally used in apparatuses which perform rectilinear motion, such as machining centers, lathes, grinders, robots, precision X-Y tables, measuring apparatuses, manufacturing facilities for semiconductor devices and liquid crystal display devices, and convey facilities. A linear guide bearing device used for these apparatuses comprises a rail, a bearing rectilinearly moving on the rail, and rolling members disposed in rolling contact between the rail and bearing.

The rolling theory of a rolling bearing is applied to linear guide bearing devices. The Lundberg-Palmgen theory in rolling bearings is also applied to the rolling fatigue in linear guide bearing devices.

Techniques obtained in the process of development of rolling bearings are utilized for materials, heat treatment conditions, and the like used in linear guide bearing devices. For example, the oxygen content in steel is suppressed to reduce nonmetallic inclusions that become the start points of separation as in rolling bearings. As for heat treatment, induction hardening and case-hardening are performed to introduce residual compression stress in the surface in order to prolong the service life as in rolling bearings.

A variety of techniques obtained in the process of development of rolling bearings are exploited in linear guide bearing devices. Higher workability is required for materials used for linear guide gearing apparatuses than those used for rolling bearings. In particular, excellent cold working like rail drawing is required. A material having a high carbon content used in rolling bearings may not often satisfy workability required in linear guide bearing devices.

Induction-hardened steel or case-hardening steel has been used for both the rail and bearing in conventional linear guide bearing devices. For example, "Special Steel" (February Issue, 1990, pp. 33 to 36) discloses a linear guide unit in which induction-hardened steel containing 0.53 wt % of carbon and 1.5 wt % of manganese and having an oxygen content of 10 ppm is used for both the rail and bearing. "NSK Technical Journal" (No. 645, pp. 45 to 59) reports use of degassified case-hardening steel for both the rail and bearing.

Of these steel materials, induction-hardened steel is most popular at present as the material for linear guide bearing devices because it can be relatively and easily heat-treated. It is, however, difficult to obtain excellent service life characteristics when induction-hardened steel is used for both the rail and bearing.

Along with recent developments of high-performance, high-speed, and high-precision mechanical apparatuses, demand has arisen for improving the performance of linear guide bearing devices. Durability is one of the performances to be improved most. For this reason, when durability is required, case-hardening steel is mainly used.

Case-hardening steel is better durability than induction-hardened steel. The use of case-hardening steel makes the heat treatment process more complex than the use of induction-hardened steel and requires bulky heat treatment facilities. The manufacturing cost becomes higher than that in the manufacture of a linear guide bearing device using induction-hardened steel.

BRIEF SUMMARY OF THE INVENTION

The present invention has been made to solve the conventional problems described above, and has as its object to provide a linear guide bearing device excellent in life time characteristics and workability at low cost.

It is another object of the present invention to provide a linear guide bearing device excellent in life time characteristics.

In order to achieve the above objects, according to an aspect of the present invention, there is provided a linear guide bearing device comprising a rail, a bearing supported by the rail and rectilinearly movable along an axial direction of the rail, and rolling members interposed between the rail and the bearing to roll with the motion of the bearing, wherein at least one of the rail and the bearing is made of induction-hardened steel comprising 0.5 to 1.1 wt % of carbon, 0.05 to 0.25 wt % of silicon, 0.3 to 0.9 wt % of manganese, 0.1 to 0.5 wt % of chromium, 0.2 to 1.0 wt % of molybdenum, and residual portion as iron and unavoidable impurities, the induction-hardened steel having a total content of carbon, manganese, and molybdenum, which satisfies both inequalities (1) and (2) below.

Preferable modes of the linear guide bearing device will be described below.

(i) The rail is made of induction-hardened steel comprising 0.6 to 0.9 wt % of carbon, 0.05 to 0.25 wt % of silicon, 0.3 to 0.9 wt % of manganese, 0.1 to 0.5 wt % of chromium, 0.2 to 1.0 wt % of molybdenum, and residual portion as iron and unavoidable impurities, and the total content of carbon, manganese, and molybdenum in the induction-hardened steel satisfy both inequalities (1) and (2) below.

(ii) Both the rail and the bearing are made of the induction-hardened steel.

According to another aspect of the present invention, there is provided a linear guide bearing device comprising a rail, a bearing supported by the rail and rectilinearly movable along an axial direction of the rail, and rolling members interposed between the rail and the bearing to roll along with motion of the bearing, wherein the bearing is made of case-hardening steel, and a finished track surface of the bearing has a total content of carbon and nitrogen within a range of 0.7 to 1.4 wt %.

Preferable modes of the linear guide bearing device will be described below.

(i) Each of the rail and bearing is made of case-hardening steel, and each finished track surface of the bearing and the bearing has a total content of carbon and nitrogen within a range of 0.7 to 1.4 wt %.

(ii) The rail is made of induction-hardened steel comprising 0.5 to 1.1 wt % of carbon, 0.05 to 0.25 wt % of silicon, 0.3 to 0.9 wt % of manganese, 0.1 to 0.5 wt % of chromium, 0.2 to 1.0 wt % of molybdenum, and residual portion as iron and unavoidable impurities, and the total content of carbon, manganese, and molybdenum in the induction-hardened steel satisfy both inequalities (1) and (2) below.

(iii) The rail is made of induction-hardened steel comprising 0.6 to 0.9 wt % of carbon, 0.05 to 0.25 wt % of silicon, 0.3 to 0.9 wt % of manganese, 0.1 to 0.5 wt % of chromium, 0.2 to 1.0 wt % of molybdenum, and residual portion as iron and unavoidable impurities, and the total content of carbon, manganese, and molybdenum in the induction-hardened steel satisfy both:

$$0.8 \leq (C \text{ wt } \% - 0.6) \times 10 + Mn \text{ wt } \% \tag{1}$$

$$(C \text{ wt } \% - 0.6) \times 10 + Mn \text{ wt } \% + Mo \text{ wt } \% \leq 2.0 \tag{2}$$

where C wt %, Mn wt %, and Mo wt % represent the weight percentages of carbon, manganese, and molybdenum to the induction-hardened steel.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

A linear guide bearing device according to the present invention will be described in detail with reference to the accompanying drawing.

Figure 1:
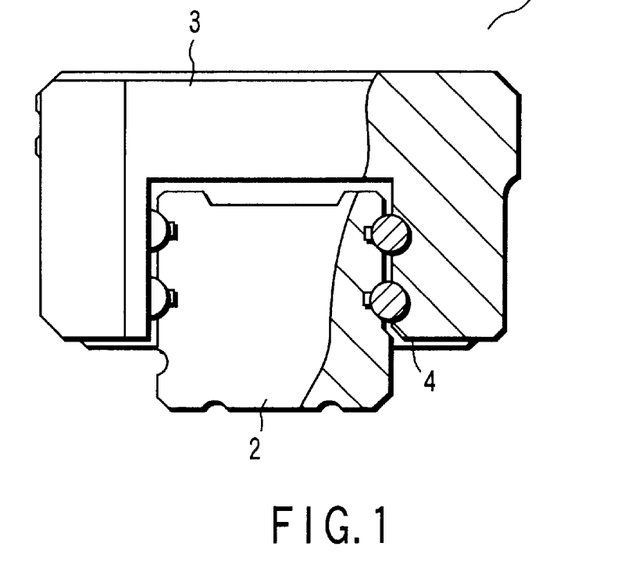
FIG. 1 is a partial sectional view schematically showing a linear guide bearing device according to the first and second embodiments of the present invention.

FIG. 1 is a partial sectional view schematically showing a linear guide bearing device according to the first and second embodiments of the present invention. FIG. 1 shows a section perpendicular to the direction of motion of a linear guide bearing device 1.

A rail 2 in the linear guide bearing device 1 shown in FIG. 1 has, for example, a rectangular section. Groove-like tracks along which balls 4 serving as rolling members roll are formed on the side surfaces of the rail 2. A bearing 3 has a C-shaped section to fit on the rail 2. Groove-like tracks along which the balls 4 roll are also formed on the side portions of the C-shaped inner wall of the bearing 3. The balls 4 serving as the rolling members are clamped between the rail 2 and bearing 3. The balls 4 are placed in rolling contact with the tracks of the rail 2 and bearing 3. Note that the bearing 3 is not direct contact with the rail 2, but is supported through the balls 4.

In the linear guide bearing device 1 according to the first embodiment of the present invention, at least one of the rail 2 and bearing 3 is made of a predetermined induction-hardened steel material. The induction-hardened steel material used in the linear guide bearing device 1 of the present invention will be described below.

The present inventors made linear guide bearing device samples by variously changing elements added to the induction-hardened steel and their contents and combinations and measured the durability and the like of these samples. According to the measurements, the steel having the following composition attained workability equal to or better than conventional induction-hardened steel and durability equivalent to that of case-hardening steel despite the fact that the obtained steel was induction-hardened steel.

C: 0.5 to 1.1 wt %
Si: 0.05 to 0.25 wt %
Mn: 0.3 to 0.9 wt %
Cr: 0.1 to 0.5 wt %
Mo: 0.2 to 1.0 wt %
Fe: balance

[the weight ratios of C, Mn, and Mo in the induction-hardened steel satisfy]

$$0.8 \leq (C \text{ wt } \% - 0.6) \times 10 + Mn \text{ wt } \% \tag{1}$$

$$(C \text{ wt } \% - 0.6) \times 10 + Mn \text{ wt } \% + Mo \text{ wt } \% \leq 2.0 \tag{2}$$

When at least one of the rail 2 and bearing 3 is made of the induction-hardened steel having the above composition, not only excellent life time characteristics but also high workability can be obtained. Unlike case-hardening steel, induction-hardened steel can be relatively and easily heat-treated and does not require a special heat treatment apparatus, thereby reducing the manufacturing cost.

The elements to be mixed in iron for the above induction-hardened steel will be described in more detail.

In the linear guide bearing device 1 of the first embodiment, 0.5 to 1.1 wt % of carbon are contained in the induction-hardened steel. When chromium and molybdenum are contained in this steel, the elements combine with carbon to form carbides to improve the wear resistance of the induction-hardened steel. The carbon content is preferably 0.6 to 0.9 wt %.

If the carbon content is less than the lower limit value, the content of carbides produced in the induction-hardened steel decreases, and a high wear resistance cannot be assured. If the carbon content exceeds the upper limit value, cracking occurs in induction hardening. A high carbon content degrades the cold working properties. The carbon content is preferably 0.7 wt % or less.

Silicon is added to steel as a deoxygenating element in refining steel. If the silicon content is less than 0.05 wt %, a sufficient deoxygenating effect cannot be obtained. If the silicon content exceeds 0.25 wt %, the cold working properties suffer.

Manganese is added to the induction-hardened steel to obtain deoxygenating and desulfrization effects and improve the hardening properties. If the manganese content is less than 0.3 wt %, these effects are insufficient. If the manganese content exceeds 0.9 wt %, the cutting properties may deteriorate.

Chromium is added to the induction-hardened steel to improve hardenability, tenacity, and wear resistance. If the chromium content is 0.1 wt % or more, these properties can be improved. However, when chromium is excessively added, the cold working properties are degraded. If the chromium content is 0.5 wt % or less, degradation of the cold working properties can be prevented.

When molybdenum is contained in the induction-hardened steel in an amount of 0.2 wt % or more, a change in texture by rolling fatigue can be delayed to greatly improve the rolling fatigue life. When the molybdenum content exceeds 1.0 wt %, the fatigue life cannot be increased further, but workability is impaired.

The induction-hardened steel used in the linear guide bearing device of the first embodiment of the present invention can contain a trace amount of impurities except the elements described above. Examples of the impurities contained in the induction-hardening steel are oxygen, Ti, and Al.

Excellent durability, and particularly, excellent rolling fatigue characteristics were found to be obtainable without degrading workability by controlling the total content of carbon, manganese, and molybdenum of all the above-described components of the induction-hardened steel to satisfy a predetermined relationship. This will be described in detail below.

The residual austenite amount greatly influences the rolling fatigue of surface start point type. More specifically, an increase in residual austenite amount can improve the rolling fatigue characteristics. In particular, when the residual austenite amount is 8% or more, a long fatigue life can be obtained. The increase in residual austenite amount, however, decreases the hardness. To obtain excellent rolling fatigue characteristics, the surface hardness Hv must be 700 or more upon induction hardening.

The residual austenite amount and surface hardness have correlation to the carbon and manganese contents. The relationship between the residual austenite amount and surface hardness, and the carbon and manganese contents were examined. As a result, a residual austenite amount of 8% or more and a surface hardness Hv of 700 or more were obtained when inequality (1) was satisfied:

$$0.8 \leq (C \text{ wt } \%-0.6) \times 10 + Mn \text{ wt } \% \quad (1)$$

Workability has correlation to the carbon, manganese, and molybdenum contents. More specifically, when the carbon, manganese, and molybdenum contents increase, workability worsens. The relationship between the workability and the carbon, manganese, and molybdenum contents was examined. Satisfactory workability was obtained if inequality (2) was satisfied:

$$(C \text{ wt } \%-0.6) \times 10 + Mn \text{ wt } \% + Mo \text{ wt } \% \leq 2.0 \quad (2)$$

When the carbon, manganese, and molybdenum contents satisfy both inequalities (1) and (2), excellent durability can be obtained without degrading workability.

The value on the left-hand side of inequality (1) is preferably 1.0 or more. The value on the right-hand side of inequality (2) is preferably 1.8 or more. If these conditions are satisfied, better workability and durability can be achieved.

In the first embodiment of the present invention, as described above, at least one of the rail 2 and bearing 3 is made of the above induction-hardened steel. When both the rail 2 and bearing 3 are made of the above induction-hardened steel, relatively excellent life characteristics and workability can be obtained, and a linear guide bearing device can be manufactured at a lower cost. When the rail 2 is made of the above induction-hardened steel, and the bearing 3 is made of case-hardening steel, a linear guide bearing device can be manufactured at a relatively low cost, and better life characteristics can be obtained.

The second embodiment of the present invention will be described below. According to the second embodiment, a bearing 3 is made of predetermined case-hardening still, i.e., predetermined cemented steel and carbonitrided steel.

Ueno et al. announced the paper entitled "Rolling Fatigue Life of Rolling Linear Guide Element" in the Tribology Conference (November 1997). They reported the fatigue test result of 20 linear guide gearing devices each constituted by a case-hardened SCM415 bearing and a induction-hardened S55C rail. According to this report, separation occurred in the track surface of the bearing, but no separation was found in the track surface of the rail.

According to their findings, the separation occurred in the track surface of the bearing because the number of times of contact between the rail track surface and the rolling member per unit travel distance that depends on the stroke is smaller than the number of times of contact between the bearing track surface and the rolling member (Tribology Conference Papers, Osaka, 1997-11, pp. 318–320, Institute of Japanese Tribology).

Ueno et al. however, do not mention the types of materials used for a rail and bearing and the type of heat treatment performed to improve the life characteristics of the linear bearing device. Also they conducted the experiment only for a material having a carbon content of 0.55 wt %.

The present inventors variously changed the materials used for bearings and their heat treatment conditions to prepare linear guide bearing devices. Consequently, the rolling life characteristics of the linear guide bearing devices could be improved by using a case-hardening steel bearing and setting the sum of the carbon and nitrogen concentrations on the track surface to fall within a predetermined range.

According to the linear guide bearing device 1 of the second embodiment of the present invention, the bearing 3 is made of case-hardening steel, and the sum of the carbon and nitrogen concentrations on the track surface of the bearing 3 is controlled to fall within the range of 0.7 to 1.4 wt %. If the sum is less than 0.7 wt %, a sufficient surface hardness cannot be obtained, and good rolling life characteristics cannot be obtained. If the sum exceeds 1.4 wt %, cracking may occur in cementation.

According to the second embodiment of the present invention, no limitation is imposed on the materials of the rail 2 as far as the bearing 3 satisfies the above conditions. It is, however, preferable that the rail 2 be made of induction-hardened steel containing carbon having a concentration of at least 0.5 to 1.1 wt %. If the carbon concentration is less than 0.5 wt %, a sufficient hardness cannot be obtained. If the carbon concentration exceeds 1.1 wt %, cracking readily takes place. In this case, as compared with the case in which both the rail 2 and bearing 3 are made of case-hardening steel, the linear guide bearing device 1 can be manufactured at a lower cost in addition to relatively good life characteristics.

The rail 2 is preferably made of induction-hardened steel described with reference to the first embodiment. When the linear guide bearing device 1 is arranged as described above, the cost can be reduced, and better life characteristics can be obtained.

The rail 2 may be made of the case-hardening steel. In this case, as compared with the case wherein the rail 2 and bearing 3 are made of conventional case-hardening steel, better life characteristics can be obtained.

The first and second embodiments described above have exemplified devices using balls as rolling members. However, the rolling member may be a roller. The rolling members may be rotatably mounted on either one of the rail and bearing at fixed positions, or may be movable with respect to both the rail and bearing.

The linear guide bearing device need not have a shape shown in FIG. 1. The shape of the device is not limited to any specific one if the bearing is supported on the rail through rolling members, and the bearing is moved along the axial direction of the rail together with rolling of the rolling members.

The present invention will be described by way of its examples.

EXAMPLE 1

A linear guide bearing device 1 shown in FIG. 1 is manufactured using induction-hardened steel materials having chemical compositions shown in Table 1, and the resultant linear guide bearing devices were defined as samples (1) to (6).

In the linear guide bearing devices 1 as samples (1) to (6), each rail 2 and a corresponding bearing 3 were made of induction-hardened steel having the same composition and were manufactured under the following conditions.

<Induction Hardening Conditions>

| Frequency | 30 kHz |
| Voltage | 10 kv |
| Current | 10A |
| Feed Speed | 8 mm/sec |
| Cooling Water Flow Rate: | 35 liters/min |

<Tempering Conditions>

| Temperature | 170° C. |
| Time | 90 min |

Linear guide bearing devices 1 as comparative samples (1) to (18) were manufactured following the same procedures as in samples (1) to (6) except that the chemical compositions of the induction-hardened steel materials were changed, as shown in Table 1 below.

A linear guide bearing device having the same shape as that of samples (1) to (6) and comparative samples (1) to (18) was manufactured using a case-hardening steel material having the composition shown in Table 1 in place of the induction-hardened steel material and was defined as comparative sample (19). Note that case-hardening steel was hardened and tempered upon cementation.

TABLE 1

| | Elements and Contents | | | | | | | | | | Numerical value | |
| --- | --- | --- | --- | --- | --- | --- | --- | --- | --- | --- | --- | --- |
| | C | Si | Mn | P | S | Ni | Cr | Cu | Mo | O | (1) | (2) |
| Sample | | | | | | | | | | | | |
| (1) | 0.64 | 0.11 | 0.42 | 0.015 | 0.014 | 0.07 | 0.19 | 0.10 | 0.62 | 8 | 0.82 | 1.44 |
| (2) | 0.66 | 0.10 | 0.39 | 0.015 | 0.014 | 0.06 | 0.21 | 0.10 | 0.23 | 9 | 0.99 | 1.22 |
| (3) | 0.65 | 0.10 | 0.51 | 0.015 | 0.015 | 0.06 | 0.20 | 0.11 | 0.28 | 9 | 1.01 | 1.29 |
| (4) | 0.64 | 0.11 | 0.60 | 0.015 | 0.014 | 0.08 | 0.20 | 0.10 | 0.32 | 9 | 1.00 | 1.32 |
| (5) | 0.63 | 0.09 | 0.82 | 0.014 | 0.009 | 0.06 | 0.22 | 0.11 | 0.60 | 9 | 1.12 | 1.72 |
| (6) | 0.67 | 0.12 | 0.53 | 0.010 | 0.014 | 0.08 | 0.18 | 0.10 | 0.65 | 9 | 1.23 | 1.88 |
| Comparative Sample | | | | | | | | | | | | |
| (1) | 0.57 | 0.11 | 0.61 | 0.014 | 0.016 | 0.06 | 0.21 | 0.08 | 0.38 | 9 | 0.31 | 0.69 |
| (2) | 0.92 | 0.10 | 0.60 | 0.014 | 0.015 | 0.06 | 0.21 | 0.09 | 0.42 | 9 | 3.80 | 4.22 |
| (3) | 0.63 | 0.03 | 0.59 | 0.015 | 0.014 | 0.08 | 0.19 | 0.10 | 0.41 | 16 | 0.89 | 1.30 |
| (4) | 0.65 | 0.28 | 0.62 | 0.014 | 0.015 | 0.07 | 0.20 | 0.11 | 0.39 | 7 | 1.12 | 1.51 |
| (5) | 0.66 | 0.09 | 0.22 | 0.016 | 0.041 | 0.07 | 0.22 | 0.10 | 0.40 | 12 | 0.82 | 1.22 |

TABLE 1-continued

| | Elements and Contents | | | | | | | | | | Numerical value | |
|---|---|---|---|---|---|---|---|---|---|---|---|---|
| | C | Si | Mn | P | S | Ni | Cr | Cu | Mo | O | (1) | (2) |
| (6) | 0.65 | 0.10 | 0.95 | 0.013 | 0.008 | 0.07 | 0.21 | 0.09 | 0.41 | 9 | 1.45 | 1.86 |
| (7) | 0.65 | 0.11 | 0.61 | 0.015 | 0.016 | 0.06 | 0.08 | 0.11 | 0.45 | 9 | 1.11 | 1.56 |
| (8) | 0.64 | 0.11 | 0.62 | 0.015 | 0.015 | 0.08 | 0.55 | 0.11 | 0.46 | 8 | 1.02 | 1.48 |
| (9) | 0.66 | 0.10 | 0.59 | 0.014 | 0.016 | 0.06 | 0.22 | 0.09 | 0.16 | 9 | 1.19 | 1.35 |
| (10) | 0.64 | 0.09 | 0.59 | 0.013 | 0.014 | 0.08 | 0.21 | 0.10 | 1.10 | 9 | 0.99 | 2.09 |
| (11) | 0.60 | 0.10 | 0.75 | 0.015 | 0.012 | 0.07 | 0.21 | 0.10 | 0.68 | 8 | 0.75 | 1.43 |
| (12) | 0.64 | 0.11 | 0.32 | 0.014 | 0.013 | 0.08 | 0.20 | 0.09 | 0.60 | 9 | 0.72 | 1.32 |
| (13) | 0.65 | 0.09 | 0.88 | 0.016 | 0.015 | 0.06 | 0.22 | 0.11 | 0.68 | 9 | 1.38 | 2.06 |
| (14) | 0.69 | 0.11 | 0.60 | 0.015 | 0.015 | 0.07 | 0.19 | 0.12 | 0.69 | 8 | 1.50 | 2.19 |
| (15) | 0.60 | 0.24 | 0.89 | 0.016 | 0.016 | 0.07 | 0.50 | 0.12 | 0.02 | 9 | 0.89 | 0.91 |
| (16) | 0.56 | 0.21 | 0.68 | 0.014 | 0.013 | 0.08 | 0.31 | 0.10 | 0.02 | 9 | 0.28 | 0.30 |
| (17) | 0.54 | 0.26 | 1.52 | 0.017 | 0.014 | 0.07 | 0.20 | 0.10 | 0.02 | 10 | 0.92 | 0.94 |
| (18) | 0.65 | 0.15 | 0.91 | 0.015 | 0.015 | 0.20 | 0.51 | 0.11 | 0.03 | 9 | 1.41 | 1.44 |
| (19) | 0.22 | 0.25 | 0.86 | 0.015 | 0.010 | 0.08 | 1.08 | 0.09 | 0.15 | 8 | — | — |

In Table 1, the contents of the elements mixed with iron are represented by weight ratios (wt %) with respect to steel, and the oxygen concentration contained in steel is represented in ppm. Numerical value (1) is a value obtained by calculating the right-hand side of inequality (1), and numerical value (2) is a value obtained by calculating the left-hand side of inequality (2).

The Vickers hardness values and residual austenite amounts of the steel materials as samples (1) to (6) and comparative samples (1) to (18) manufactured as described above were measured. These measurements were performed by measuring 10 track surface positions of each of the rail 2 and bearing 3 and averaging the 10 measurement values.

A drilling test was run for the steel materials used in samples (1) to (6) and comparative samples (1) to (18) under the following conditions:

<Drilling Test Conditions>

| Drill | SKH51 |
|---|---|
| Cutting Speed | 23 m/min |
| Feed | 0.3 mm/rev |
| Drilling Depth | 20 mm |

Note that the drilling test was performed by counting the number of holes which could be formed without making strange noise upon sequentially drilling the steel materials.

A life test was run for the linear guide bearing devices as samples (1) to (6) and comparative samples (1) to (19) manufactured as described above.

<Life Test Conditions>

| Load Condition | P/C = 0.25 |
|---|---|
| Bearing Average Moving Speed | 23 m/min |
| Lubricant | grease lubricant |

The life test was conducted by measuring the time until separation occurred on at least one of the tracking surfaces of the rail 2 and bearing 3, and by obtaining a life value. The respective life values were filled in the Weibull probability chart to obtain a cumulative fraction defective 10% ($L_{10}$) value. The fatigue life of comparative sample (16) was defined as 1, and the relative value of the $L_{10}$ value of each sample with respect to the $L_{10}$ value of comparative sample (16) was obtained to calculate the relative fatigue life of each sample.

The drilling properties of comparative samples (4), (6), (8), (10), (13), and (14) were poor from the start, and no life test was conducted for these samples. Four out of 10 comparative samples (2) cracked in induction hardening, and no life test was conducted for comparative sample (2).

The resultant average Vickers hardness values, residual austenite amounts, drilling properties, and relative fatigue lives are shown in Table 2 below.

TABLE 2

| Sample | Average Vickers hardness (Hv) | Residual austenite amount (%) | Number of drilled holes | Relative fatigue life |
|---|---|---|---|---|
| (1) | 713 | 14 | 66 | 4.1 |
| (2) | 710 | 12 | 59 | 3.6 |
| (3) | 720 | 10 | 55 | 4.0 |
| (4) | 724 | 11 | 52 | 3.8 |
| (5) | 701 | 15 | 62 | 4.4 |
| (6) | 715 | 9 | 58 | 4.5 |

TABLE 2-continued

|  | Average Vickers hardness (Hv) | Residual austenite amount (%) | Number of drilled holes | Relative fatigue life |
|---|---|---|---|---|
| Comparative Sample | | | | |
| (1) | 688 | 13 | 74 | 2.9 |
| (2) | 724 | 9 | 22 | — |
| (3) | 711 | 10 | 55 | 2.3 |
| (4) | 719 | 9 | 22 | — |
| (5) | 709 | 11 | 65 | 1.9 |
| (6) | 711 | 10 | 18 | — |
| (7) | 700 | 12 | 48 | 2.2 |
| (8) | 720 | 8 | 16 | — |
| (9) | 710 | 8 | 54 | 1.4 |
| (10) | 714 | 6 | 22 | — |
| (11) | 686 | 6 | 56 | 1.9 |
| (12) | 678 | 7 | 62 | 2.0 |
| (13) | 718 | 9 | 14 | — |
| (14) | 722 | 9 | 18 | — |
| (15) | 708 | 8 | 47 | 1.2 |
| (16) | 679 | 9 | 75 | 1.0 |
| (17) | 660 | 10 | 16 | 0.8 |
| (18) | 711 | 9 | 18 | 1.4 |
| (19) | 735 | 26 | — | 4.9 |

As is apparent from Table 2, the numbers of drilled holes are small in comparative samples (2), (4), (6), (8), (10), (13), (14), (17), and (18); workability of these comparative samples is poor. On the other hand, the numbers of drilled holes are relatively large in comparative samples (1), (3), (5), (7), (9), (11), (12), (15), and (16); workability of these comparative samples is excellent. However, these comparative samples do not have a long relative fatigue life.

To the contrary, the life characteristics of samples (1) to (6) of Example 1 are much better than those of comparative samples (1) to (18) which use the conventional induction-hardened steel materials and are almost equal to those of comparative sample (19) which uses case-hardening steel. Workability of samples (1) to (6) is virtually equal to or better than that of comparative samples (1), (3), (5), (7), (9), (11), (12), (15), and (16).

As described above, samples (1) to (6) of Example 1 of the present invention provide not only high workability but also excellent life characteristics.

EXAMPLE 2

Linear guide bearing devices 1 shown in FIG. 1 were manufactured as follows.

Materials (1) and (2) shown in Table 3 below were melted and molded, and the molded bodies were heat-treated as follows to manufacture rails 2 and bearings 3. Not that the rail 2 manufactured using material (1) is represented as rail [1], and the rail 2 manufactured using material (2) is represented as rail [2].

Material (1) was cemented under the following conditions.

<Heat Treatment Conditions>

| Cementation Temperature | 950° C. |
|---|---|
| Cementation Atmosphere | Endothermic gas (RX gas) |
| Hardening | 840° C., oil-cooled |
| Temper | 180° C. × 120 min |

Material (2) was carbonitrided under the following conditions.

<Heat Treatment Conditions>

| Carbonitriding Temperature | 950° C. |
|---|---|
| Carbonitriding Atmosphere | Endothermic gas + 3 to 5 vol % of ammonia gas |
| Hardening | 840° C., oil-cooled |
| Temper | 180° C. × 120 min |

Rails 2 were manufactured using materials (3) to (10) (induction-hardened steel) shown in Table 3 below under the same induction hardening and tempering conditions as in Example 1. Note that the rails 2 manufactured using materials (3) to (10) are represented as rails [3] to [10], respectively.

Bearings 3 were manufactured using materials (3), (6), and (10) (induction-hardened steel) shown in Table 3 below under the same induction hardening and tempering conditions as in Example 1. Note that the bearings 3 manufactured using materials (3), (6), and (10) are represented as bearings [3], [6], and [10], respectively.

TABLE 3

| Material No. | C | Si | Mn | P | S | Ni | Cr | Cu | Mo | O | (1) | (2) |
|---|---|---|---|---|---|---|---|---|---|---|---|---|
| (1) | 0.18 | 0.15 | 0.41 | 0.015 | 0.010 | 0.08 | 1.08 | 0.09 | 0.15 | 8 | — | — |
| (2) | 0.41 | 0.40 | 0.88 | 0.020 | 0.016 | 0.07 | 0.41 | 0.08 | 0.23 | 9 | — | — |
| (3) | 0.64 | 0.11 | 0.42 | 0.015 | 0.014 | 0.07 | 0.19 | 0.10 | 0.62 | 8 | 0.82 | 1.44 |
| (4) | 0.66 | 0.10 | 0.39 | 0.015 | 0.014 | 0.06 | 0.21 | 0.10 | 0.23 | 9 | 0.99 | 1.22 |
| (5) | 0.65 | 0.10 | 0.51 | 0.015 | 0.015 | 0.06 | 0.20 | 0.11 | 0.28 | 9 | 1.01 | 1.29 |
| (6) | 0.64 | 0.11 | 0.60 | 0.015 | 0.014 | 0.08 | 0.20 | 0.10 | 0.32 | 9 | 1.00 | 1.32 |
| (7) | 0.63 | 0.09 | 0.82 | 0.014 | 0.009 | 0.06 | 0.22 | 0.11 | 0.60 | 8 | 1.12 | 1.72 |
| (8) | 0.60 | 0.24 | 0.89 | 0.016 | 0.016 | 0.07 | 0.50 | 0.12 | 0.02 | 9 | 0.89 | 0.91 |
| (9) | 0.54 | 0.26 | 1.52 | 0.017 | 0.014 | 0.07 | 0.20 | 0.10 | 0.02 | 10 | 0.92 | 0.94 |
| (10) | 0.56 | 0.21 | 0.68 | 0.014 | 0.013 | 0.08 | 0.31 | 0.10 | 0.02 | 9 | 0.28 | 0.30 |

In Table 3, the contents of the elements mixed with iron are represented by weight ratios (wt %) with respect to steel, and the oxygen concentration contained in steel is represented in ppm. Numerical value (1) is a value obtained by calculating the right-hand side of inequality (1), and numerical value (2) is a value obtained by calculating the left-hand side of inequality (2).

As described above, the carbon and nitrogen concentrations on the surfaces, Vickers hardness values of the surfaces, residual austenite amounts, and the numbers of case-hardened bearings that used materials (1) and (2) and that cracked among the bearings 3 manufactured as described above were measured. The Vickers hardness values and residual austenite amounts were measured by measuring 10 track surface positions of each of the rail 2 and bearing 3 and averaging the 10 measurement values. The measurement results are shown in Table 4 below.

differences in surface carbon and nitrogen concentrations among the bearings are obtained by changing the composition and concentration in the furnace gas in case-hardening.

Figure 2:
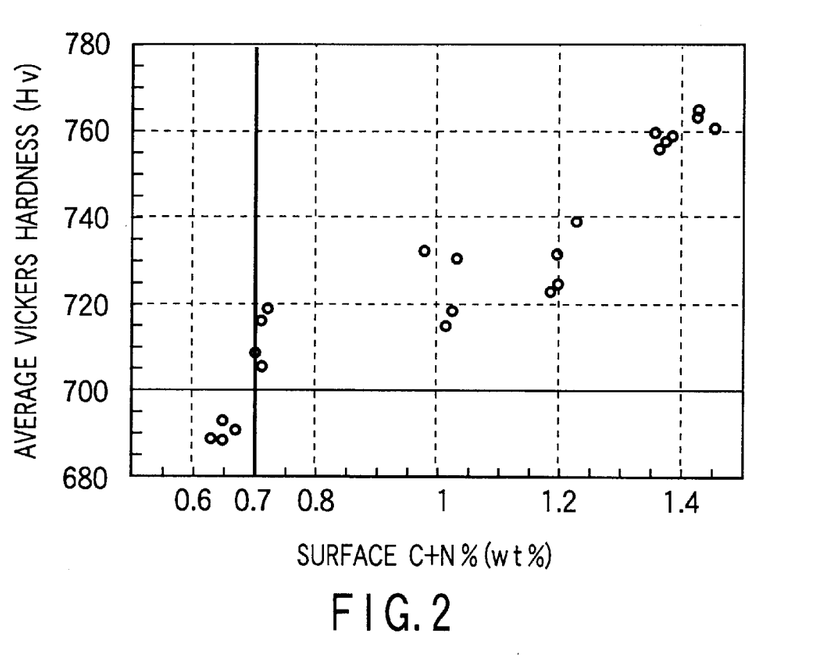
FIG. 2 is a graph showing the relationship between the average Vickers hardness value and the sum of surface carbon concentration and surface nitrogen concentration of a bearing used in a linear guide bearing device according to Example 2 of the present invention.

FIG. 2 is a graph showing the relationship between the average Vickers hardness value and the sum of surface carbon and nitrogen concentrations of a bearing used in a linear guide bearing device of Example 2 of the present invention. Referring to FIG. 2, the sum (wt %) of the surface carbon and nitrogen concentrations of the bearing is plotted along the abscissa, while the average Vickers hardness value (Hv) is plotted along the ordinate. As shown in this graph, if the sum of the surface carbon and nitrogen concentrations of the bearing 3 is set to be 0.7 or more, a surface hardness value of 700 Hv or more is obtained.

The rails 2 and the bearings 3 were combined, as shown in Table 5 below, to manufacture linear guide bearing devices 1, and these devices were defined as samples (7) to

TABLE 4

| Bearing No. | Material No. | Surface concentration (wt %) | | | Average Vickers hardness (Hv) | Residual austenite amount (%) | Number of cracked bearing |
|---|---|---|---|---|---|---|---|
| | | C | N | C + N | | | |
| [1]-1 | (1) | 0.71 | 0 | 0.71 | 716 | 13 | 0 |
| [1]-2 | (1) | 0.58 | 0.12 | 0.70 | 709 | 22 | 0 |
| [1]-3 | (1) | 0.65 | 0 | 0.65 | 689 | 18 | 0 |
| [1]-4 | (1) | 0.56 | 0.09 | 0.65 | 693 | 28 | 0 |
| [1]-5 | (1) | 1.01 | 0 | 1.01 | 715 | 16 | 0 |
| [1]-6 | (1) | 0.92 | 0.10 | 1.02 | 718 | 23 | 0 |
| [1]-7 | (1) | 1.19 | 0 | 1.19 | 722 | 18 | 0 |
| [1]-8 | (1) | 0.98 | 0.22 | 1.20 | 724 | 27 | 0 |
| [1]-9 | (1) | 0 | 1.37 | 1.37 | 756 | 11 | 0 |
| [1]-10 | (1) | 1.18 | 0.21 | 1.39 | 758 | 26 | 0 |
| [1]-11 | (1) | 1.44 | 0 | 1.44 | 761 | 9 | 2 |
| [1]-12 | (1) | 1.16 | 0.27 | 1.43 | 763 | 16 | 3 |
| [2]-1 | (2) | 0.72 | 0 | 0.72 | 719 | 11 | 0 |
| [2]-2 | (2) | 0.56 | 0.13 | 0.69 | 706 | 18 | 0 |
| [2]-3 | (2) | 0.67 | 0 | 0.67 | 691 | 17 | 0 |
| [2]-4 | (2) | 0.54 | 0.09 | 0.63 | 689 | 29 | 0 |
| [2]-5 | (2) | 0.98 | 0 | 0.98 | 732 | 18 | 0 |
| [2]-6 | (2) | 0.79 | 0.24 | 1.03 | 730 | 28 | 0 |
| [2]-7 | (2) | 1.23 | 0 | 1.23 | 739 | 17 | 0 |
| [2]-8 | (2) | 1.11 | 0.09 | 1.20 | 731 | 27 | 0 |
| [2]-9 | (2) | 1.36 | 0 | 1.36 | 759 | 10 | 0 |
| [2]-10 | (2) | 1.18 | 0.20 | 1.38 | 757 | 29 | 0 |
| [2]-11 | (2) | 1.43 | 0 | 1.43 | 764 | 10 | 4 |
| [2]-12 | (2) | 1.18 | 0.28 | 1.46 | 760 | 18 | 3 |

Twelve bearings having different surface carbon and nitrogen concentrations using each of materials (1) and (2), i.e., a total of 24 bearings, are shown in Table 4. The (33) and comparative samples (20) to (24). No linear guide bearing device 1 was manufactured using cracked bearings. Eight devices were manufactured for each of samples (7) to (33) and comparative samples (20) to (24). A life test was run for these samples under the same conditions as in Example 1. The results are shown in Table 5 below.

TABLE 5

| | Rail No. | Bearing No. | Relative fatigue life | Failure count Rail | Failure count Bearing |
|---|---|---|---|---|---|
| Sample | | | | | |
| (7) | [3] | [1]-1 | 5.1 | 0 | 8 |
| (8) | [3] | [1]-2 | 5.2 | 0 | 8 |
| (9) | [4] | [1]-5 | 5.6 | 0 | 8 |
| (10) | [4] | [1]-6 | 5.5 | 0 | 8 |
| (11) | [5] | [1]-7 | 5.9 | 0 | 8 |
| (12) | [5] | [1]-8 | 5.7 | 0 | 8 |
| (13) | [8] | [1]-9 | 5.9 | 3 | 5 |
| (14) | [10] | [1]-10 | 6.1 | 3 | 5 |
| (15) | [5] | [2]-1 | 5.5 | 0 | 8 |
| (16) | [5] | [2]-2 | 5.9 | 0 | 8 |
| (17) | [5] | [2]-5 | 5.7 | 0 | 8 |
| (18) | [6] | [2]-6 | 6.1 | 0 | 8 |
| (19) | [6] | [2]-7 | 5.9 | 0 | 8 |
| (20) | [6] | [2]-8 | 6.0 | 0 | 8 |
| (21) | [7] | [2]-9 | 5.8 | 0 | 8 |
| (22) | [9] | [2]-10 | 6.2 | 2 | 6 |
| (23) | [10] | [2]-10 | 6.3 | 3 | 5 |
| (24) | [1] | [1]-1 | 4.9 | 0 | 8 |
| (25) | [1] | [1]-2 | 5.3 | 0 | 8 |
| (26) | [1] | [1]-9 | 5.8 | 0 | 8 |
| (27) | [1] | [1]-10 | 6.0 | 0 | 8 |
| (28) | [2] | [2]-1 | 5.6 | 0 | 8 |
| (29) | [2] | [2]-2 | 6.1 | 0 | 8 |
| (30) | [2] | [2]-9 | 5.7 | 0 | 8 |
| (31) | [2] | [2]-10 | 6.2 | 0 | 8 |
| (32) | [3] | [3] | 4.1 | 0 | 8 |
| (33) | [6] | [6] | 3.8 | 0 | 8 |
| Comparative Sample | | | | | |
| (20) | [1] | [1]-3 | 3.8 | 0 | 8 |
| (21) | [1] | [1]-4 | 3.7 | 0 | 8 |
| (22) | [2] | [2]-3 | 3.6 | 0 | 8 |
| (23) | [2] | [2]-4 | 3.5 | 0 | 8 |
| (24) | [10] | [10] | 1 | 0 | 8 |

The fatigue lives of the samples in Table 5 are represented by values relative to the $L_{10}$ value of comparative sample (24).

Figure 3:
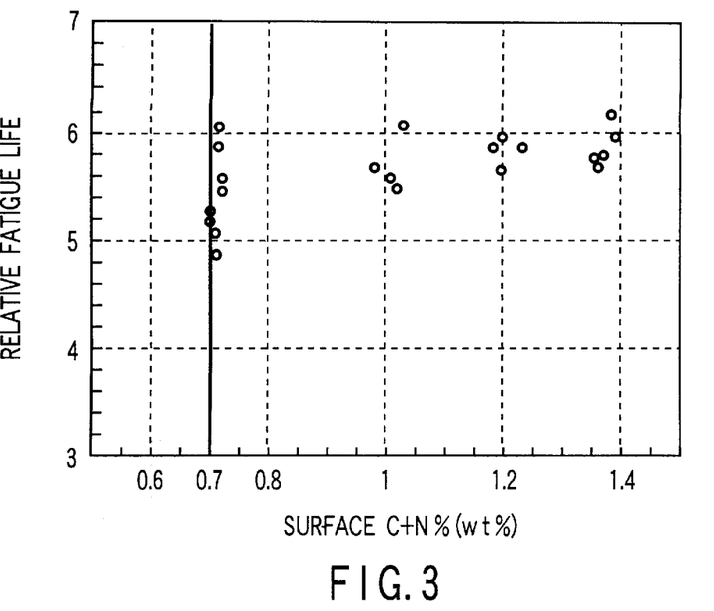
FIG. 3 is a graph showing the relationship between the relative fatigue life and the sum of surface carbon concentration and surface nitrogen concentration of the bearing used in the linear guide bearing device according to Example 2 of the present invention.

FIG. 3 is a graph showing the relationship between the relative fatigue life and the sum of surface carbon and nitrogen concentrations of a bearing for a linear guide bearing device according Example 2 of the present invention. Referring to FIG. 3, the sum of the surface carbon and nitrogen concentrations of the bearing is plotted along the abscissa, and the relative fatigue life is plotted along the ordinate. Data of samples (13), (14), (22), and (23) whose rails were damaged are omitted. Data of samples (32) and (33) and comparative sample (24) each of which has a bearing made of induction-hardened steel are also omitted.

As shown in this graph, if the sum of the surface carbon and nitrogen concentrations of the bearing 3 is set to be 0.7 or more, the relative fatigue life can be greatly improved as compared with the case in which the sum is less than 0.7.

As shown in Table 5, no rails 2 were damaged but only the bearings 3 were damaged in samples (7) to (12), samples (15) to (21), samples (24) to (33), and comparative samples (20) to (24). Both the rails 2 and the bearings 3 were damaged in samples (13), (14), (22), and (23) due to the differences in materials used in the rails 2.

The relationship between the carbon content, the surface hardness value, and the cracking occurrence frequency of rails 2 was checked as follows.

Materials which used S30C as a base and whose carbon contents were variously changed in the range of 0.3 to 1.2 wt %, were used to form rails 2. These rails 2 were heat-treated under the induction hardening conditions and tempering conditions. The hardness values of 10 rail track surface positions of the rails 2 heat-treated as described above were measured and averaged. In addition, cracking on the rail track surfaces was visually checked.

Figure 4:
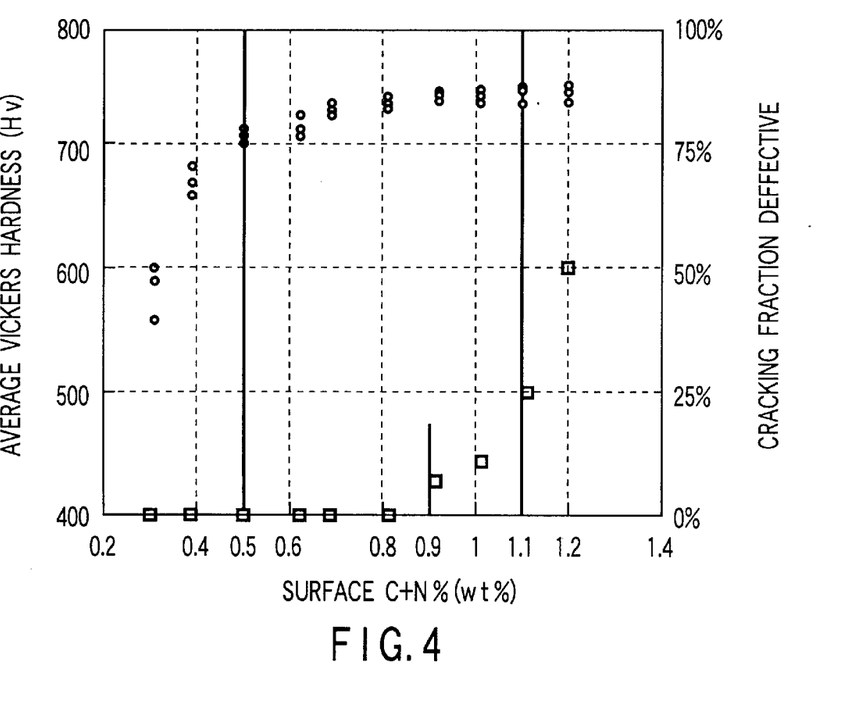
FIG. 4 is a graph showing the relationship between the average Vickers hardness value and the carbon content and the relationship between the carbon content and the cracking fraction defective in a rail used in the linear guide bearing device according to Example 2 of the present invention.

FIG. 4 is a graph showing the relationship between the average Vickers hardness value and the carbon content and the relationship between the carbon content and the cracking fraction defective in a rail used in the linear guide bearing device according to Example 2 of the present invention. Referring to FIG. 4, the carbon concentration (wt %) in the rail is plotted along the abscissa, and the average Vickers hardness value (Hv) and cracking fraction defective (%) are plotted along the ordinate. In FIG. 4, "○" represents surface hardness data, and "□" represents cracking fraction defective data.

As shown in FIG. 4, the lower the carbon concentration becomes, the lower the cracking fraction defective becomes. The higher the carbon concentration becomes, the higher the surface hardness becomes. When the carbon concentration is set to be 1.1 wt % or less, the cracking fraction defective can be reduced well. In particular, when the carbon concentration is set to be 0.9% or less, cracking can be nearly perfectly prevented. When the carbon concentration is set to be 0.5 wt % or more, a sufficient hardness, i.e., a value of 700 Hv or more can be obtained.

The relative fatigue lives of the linear guide bearing devices 1 obtained in Examples 1 and 2 will be compared below.

Figure 5:
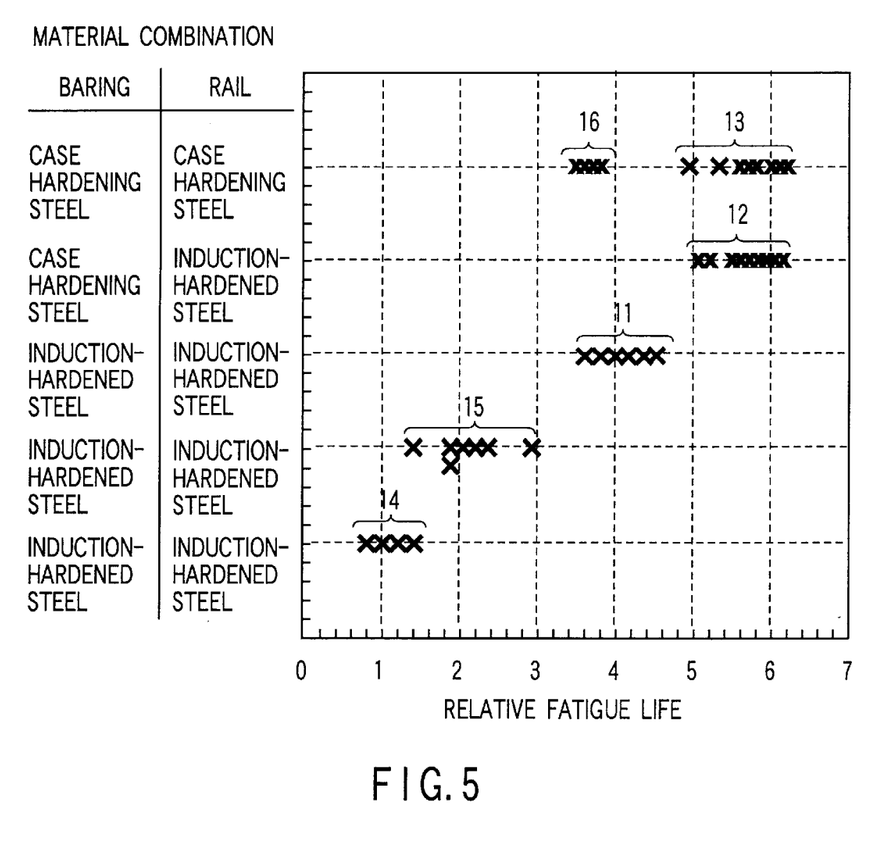
FIG. 5 is a graph showing the relative fatigue life of the linear guide bearing device according to Example 2 of the present invention.

FIG. 5 is a graph showing the relative fatigue life of the linear guide bearing device of Example 2 of the present invention. The combination of materials used for the rail 2 and bearing 3 is plotted along FIG. 5, and the relative fatigue life obtained for each linear guide bearing device 1 is plotted along the abscissa.

Reference numeral 11 denotes data obtained for samples (1) to (6); 12, data obtained for samples (7) to (23); and 13, data obtained for samples (24) to (31). Reference numerals 14 denotes data obtained for comparative samples (15) to (18); 15, data obtained for comparative samples (1), (3), (5), (7), (9), (11), and (12); and 16, data obtained for comparative samples (20) to (23).

As shown in FIG. 5, the life characteristics of linear guide bearing devices 1 of reference numerals 11 to 13 of Example 2 are far better that those of conventional linear guide bearing devices (reference numerals 14 and 15) using induction-hardened steel for the rails 2 and bearings 3. The life characteristics of linear guide bearing devices 1 of reference numerals 11 to 13 of Example 2 of the present invention are equivalent to or better than those of a conventional linear guide bearing device (reference numeral 16) using case-hardening steel for the rail 2 and bearing 3.

According to a linear guide bearing device 1 of the present invention, even if both a rail 2 and bearing 3 are made of induction-hardened steel, sufficient life characteristics can be obtained. When a rail 2 is made of induction-hardened steel and a bearing is made of case-hardening steel, and when both a rail 2 and bearing 3 are made of case-hardening steel, better life characteristics can be obtained than the conventional linear guide bearing device using a rail 2 and bearing 3 made of case-hardening steel.

As has been described above, according to a linear guide bearing device of the present invention, as at least one of a rail and bearing is made of predetermined induction-hardened steel, life characteristics equivalent to or better than those of a conventional linear guide bearing device using case-hardening steel can be obtained. The induction-hardened steel does not require a complicated heat treatment process or bulky heat treatment facilities, and is excellent in workability. According to the present invention, therefore, there is provided a linear guide bearing device which is excellent in life characteristics and workability and can be manufactured at a low cost.

According to a linear guide bearing device of the present invention, better life characteristics can be obtained as compared with the conventional linear guide bearing device using induction-hardened steel. In this case, even if a rail is made of induction-hardened steel, excellent life characteristics can be obtained, thereby reducing the cost.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A linear guide bearing device comprising a rail, a bearing supported by said rail and rectilinearly movable along an axial direction of said rail, and rolling members interposed between said rail and said bearing to roll along with motion of said bearing, wherein at least one of said rail and said bearing is made of induction-hardened steel comprising 0.5 to 1.1 wt % of carbon, 0.05 to 0.25 wt % of silicon, 0.3 to 0.9 wt % of manganese, 0.1 to 0.5 wt % of chromium, 0.2 to 1.0 wt % of molybdenum, and residual portion as iron and unavoidable impurities, said induction-hardened steel having a total content of carbon, manganese, and molybdenum, which satisfies both:

$$0.8 \leq (C \text{ wt \%} - 0.6) \times 10 + Mn \text{ wt \%} \tag{1}$$

$$(C \text{ wt \%} - 0.6) \times 10 + Mn \text{ wt \%} + Mo \text{ wt \%} \leq 2.0 \tag{2}$$

where C wt %, Mn wt %, and Mo wt % represent weight percentages of carbon, manganese, and molybdenum to said induction-hardened steel.

2. The linear guide bearing device according to claim 1, wherein said bearing is made of case-hardening steel, and a finished track surface of said bearing has a total content of carbon and nitrogen within a range of 0.7 to 1.4 wt %.

3. The linear guide bearing device according to claim 1, wherein both said rail and said bearing are made of said induction-hardened steel.

4. A linear guide bearing device comprising a rail, a bearing supported by said rail and rectilinearly movable along an axial direction of said rail, and rolling members interposed between said rail and said bearing to roll along with motion of said bearing, wherein said rail is made of induction-hardened steel comprising 0.5 to 1.1 wt % of carbon, 0.05 to 0.25 wt % of silicon, 0.3 to 0.9 wt % of manganese, 0.1 to 0.5 wt % of chromium, 0.2 to 1.0 wt % of molybdenum, and residual portion as iron and unavoidable impurities, said induction-hardened steel having a total content of carbon, manganese, and molybdenum, which satisfies both:

$$0.8 \leq (C \text{ wt \%} - 0.6) \times 10 + Mn \text{ wt \%} \tag{1}$$

$$(C \text{ wt \%} - 0.6) \times 10 + Mn \text{ wt \%} + Mo \text{ wt \%} \leq 2.0 \tag{2}$$

where C wt %, Mn wt %, and Mo wt % represent weight percentages of carbon, manganese, and molybdenum to said induction-hardened steel, and wherein said bearing is made of case-hardening steel, and a track surface of said bearing finished has a total content of carbon and nitrogen within a range of 0.7 to 1.4 wt %.

* * * * *